United States Patent [19]
Herzl

[11] 4,033,188
[45] July 5, 1977

[54] LINEAR VORTEX-TYPE FLOWMETER

[75] Inventor: Peter J. Herzl, Morrisville, Pa.

[73] Assignee: Fischer & Porter Co., Warminster, Pa.

[22] Filed: May 30, 1975

[21] Appl. No.: 582,300

[52] U.S. Cl. .......................................... 73/194 VS
[51] Int. Cl.² .......................................... G01F 1/32
[58] Field of Search ....... 73/194 B, 194 VS, 194 E, 73/204, 231 R, 231 M, 233; 235/151.34

[56] References Cited

UNITED STATES PATENTS

| | | | |
|---|---|---|---|
| 3,116,639 | 1/1964 | Bird | 73/194 |
| 3,278,728 | 10/1966 | Ragsdale | 73/205 X |
| 3,691,838 | 9/1972 | Kalotay | 73/205 |
| 3,729,995 | 5/1973 | Kovacs et al. | 73/194 |
| 3,772,915 | 11/1973 | Stalmer | 235/151.34 |
| 3,888,120 | 6/1975 | Burgess | 73/194 |
| 3,891,391 | 6/1975 | Boone | 73/204 |
| 3,945,253 | 3/1976 | Liu et al. | 73/231 |
| 3,965,341 | 6/1976 | Honey | 73/194 |

Primary Examiner—Herbert Goldstein

[57] ABSTRACT

An electronic data processing system for a vortex-type flowmeter wherein the fluid to be measured is directed past a vortex-producing element to induce fluidic variations whose frequency is a function of flow rate. These variations are detected by a sensor yielding a signal having an A-C component whose frequency represents the uncorrected flow rate and a D-C component whose magnitude represents the temperature of the fluid. In order to correct for the effect of temperature on the accuracy of the reading, the signal components are separated from each other and converted into corresponding digital values which are fed into the data processing system to which are also applied digital values representing the fluid characteristics, the system producing an output signal representing the true flow rate.

8 Claims, 6 Drawing Figures

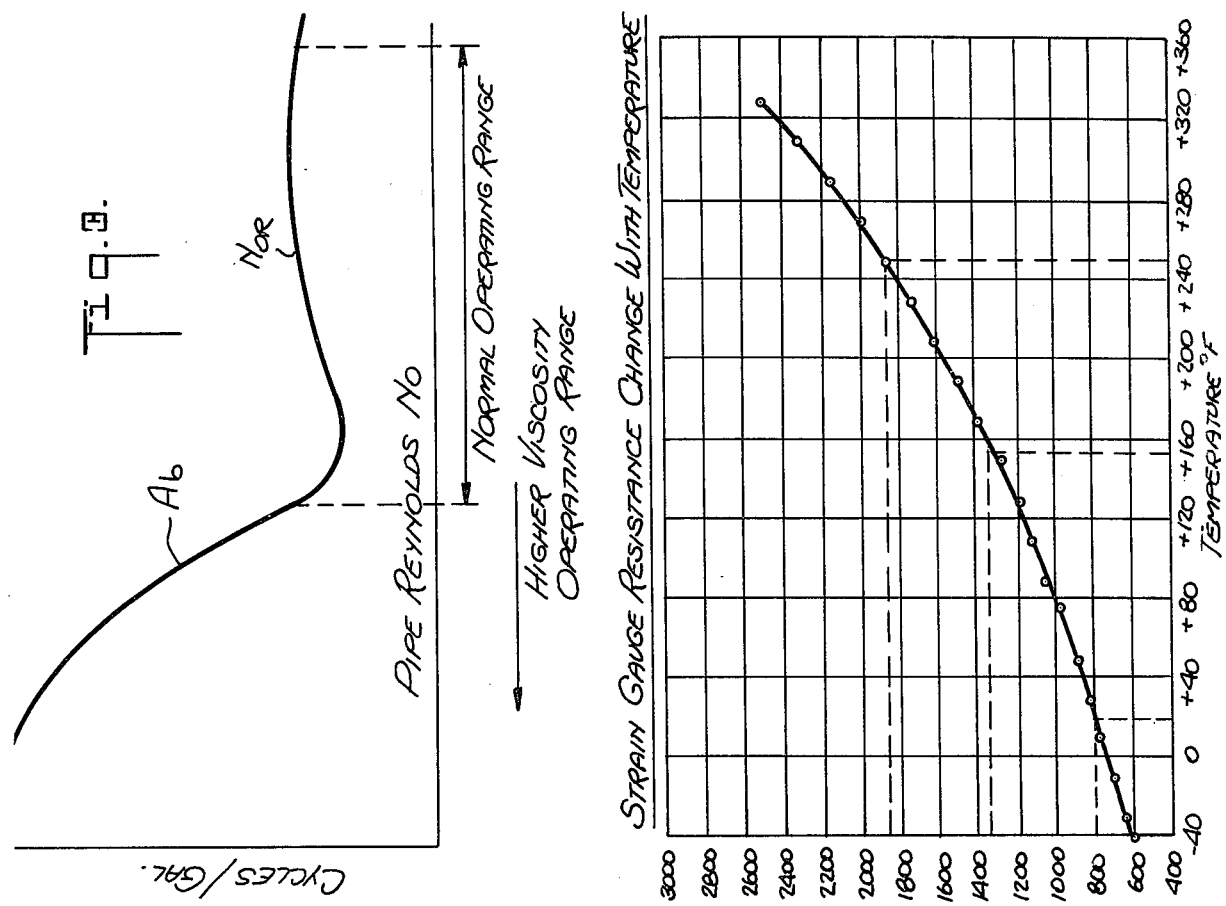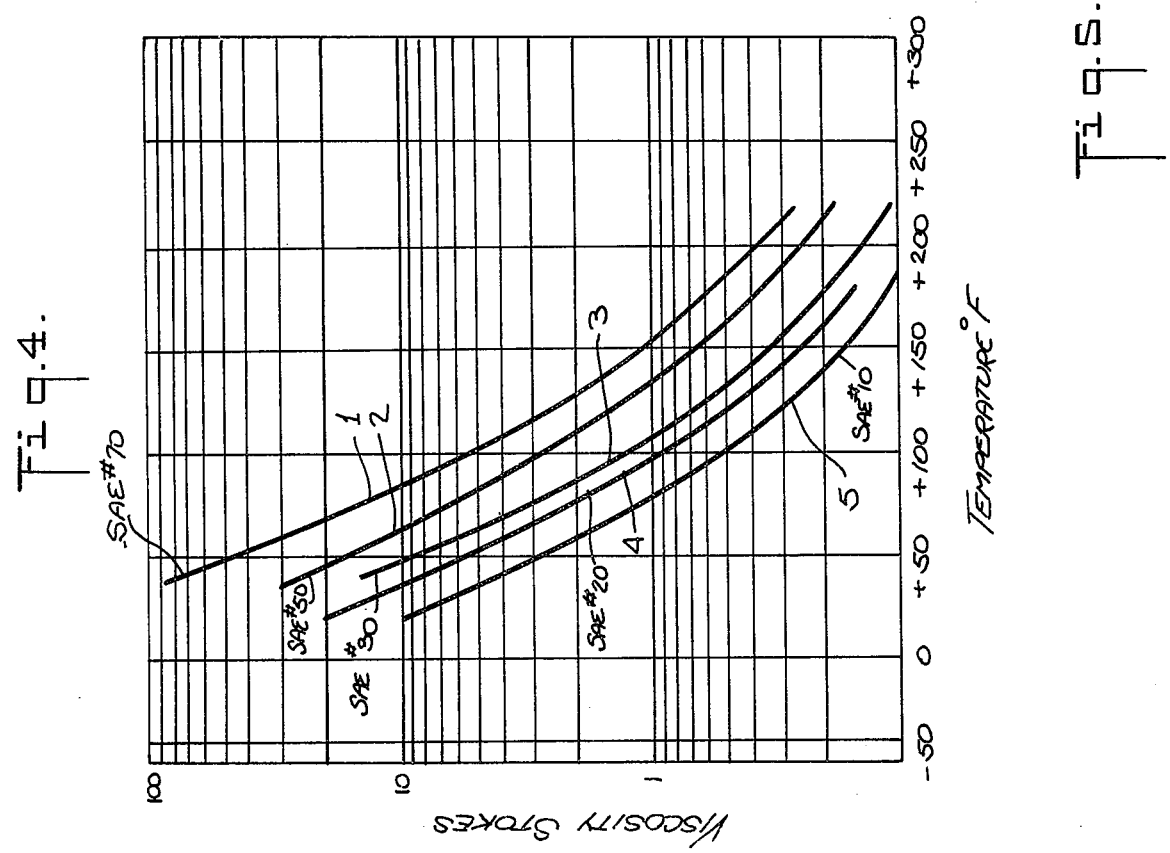

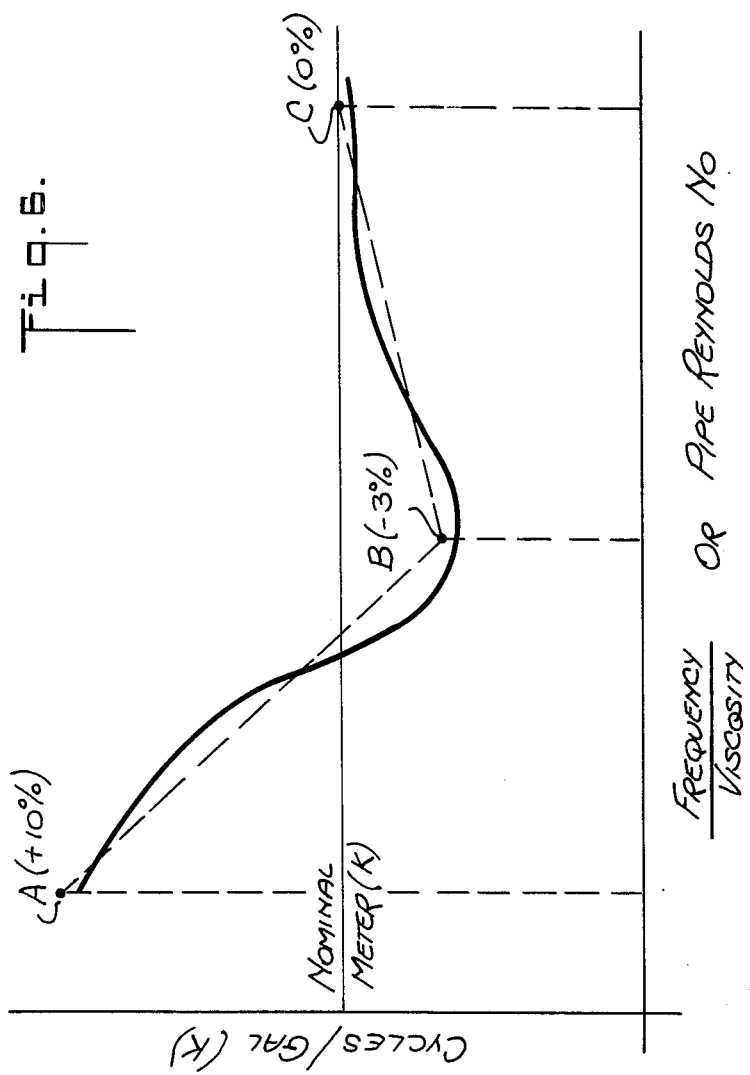

LINEAR VORTEX-TYPE FLOWMETER

BACKGROUND OF THE INVENTION

This invention relates generally to flowmeters of the vortex type, and more particularly to a vortex meter associated with an electronic data processing system adapted to provide highly accurate mass flow or volumetric flow measurements over a broad fluid viscosity range.

In many industrial processes, one must be able to measure the volumetric flow of fluids being treated or supplied in order to carry out various control functions. It is also necessary, in some instances, to determine the mass flow of the fluids. Existing types of vortex flowmeters are capable of effecting volumetric flow or mass flow measurement.

It is well known that under certain circumstances the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. In order to convert a volumetric reading to a reading of mass flow, one must multiply the volume measurement by the density of the fluid being measured.

An improved form of vortex-type flowmeter is disclosed in Burgess U.S. Pat. No. 3,589,185 wherein the signal derived from the fluid oscillation is relatively strong and stable to afford a favorable signal-to-noise ratio insuring accurate flow-rate information over a broad range. In this meter, the obstacle assembly mounted in the flow conduit is constituted by a block positioned across the conduit with its longitudinal axis at right angles to the direction of fluid flow, a strip being similarly mounted behind the block and being spaced therefrom to define a gap which serves to trap Karman vortices and to strengthen and stabilize the vortex street. This vortex street is sensed to produce a signal whose frequency is proportional to flow rate.

In Herzl Pat. No. 3,867,839, the disclosure of which is incorporated herein by reference, in lieu of a thermistor sensor of the type disclosed in the Burgess patent, use is made of a strain gauge sensor. In the Herzl arrangement, the obstacle assembly is formed by a front section mounted across the flow tube and a rear section spaced from the front section by means of a flexible web to define a gap serving to trap the Karman vortices. Because the rear section, which is cantilevered from the front section, is deflectable, it is excited into vibration by the vortices at a rate whose frequency is proportional to fluid flow. This vibratory motion is sensed by the strain gauge sensor, which is elastically suspended in a cavity within the cantilever structure to produce a signal indicative of flow rate.

In a vortex type flowmeter, the meter factor (i.e., the number of cycles generated per gallon of fluid passing through the flow tube) is fairly constant with changes in Reynolds number, but only within the normal operating range of the meter. When applied to the flow of fluid in a pipe, Reynolds number equals the product of density, velocity and pipe diameter divided by the coefficient of the fluid viscosity.

The calibration curve for a vortex-type flowmeter is produced by plotting the Reynolds number of the flow tube against the meter factor (cycle/gal.) is relatively unchanged within the normal viscosity range. For example, the viscosity of water at 60° C is 9.89, at 80° C it is 7.42 and at 100° C it is 5.92. Assuming that these viscosity values lie within the normal range of the instrument, the meter factor will be substantially independent of changes in water viscosity resulting from variations in temperature between 60° and 100° C, and the reading of the meter will reflect flow rate with reasonable accuracy.

But if the viscosity of the water being measured lies outside of the normal range, then the meter factor will rise sharply as the viscosity increases. Thus assuming the normal range ends at a viscosity value of 21.0, the meter will be non-linear and inaccurate in a range including a water temperature of 20° C producing a viscosity value of 21.1, a water temperature of 10° C resulting in a viscosity value of 27.2 and a temperature of 0° C producing a viscosity of 37.5. In this abnormal range, the meter factor will be both a function of flow rate and fluid viscosity.

Thus to obtain accurrate flow measurement in a broad viscosity range encompassing both that portion of the calibration curve where the meter factor is fairly constant with changes in Reynolds number and the remaining portion where a change in Reynolds number produces a marked change in meter factor, a correction for viscosity is essential. Similarly, accurate flow measurement is impossible without a density correction for changes in temperature which gives rise to changes in fluid density. The need for correction is even more pronounced in vortex meters for measuring hydrocarbon fluids, for oils exhibit large changes in viscosity and density with changes in temperature.

SUMMARY OF INVENTION

In view of the foregoing, it is the main object of this invention to provide a highly accurate flowmeter of the vortex type whose reading is corrected for changes in the fluid viscosity and density resulting from changes in the temperature of the fluid being metered, whereby the meter is substantially linear throughout a broad range.

More particularly, an object of this invention is to provide an electronic data processing system operating in conjunction with a vortex-type meter and responsive to input data constituted by a value representing the uncorrected flow rate, a value representing the temperature of the fluid, and values representing the physical properties of the fluid, to produce an output signal affording accurate measurements over the non-linear range of the flowmeter as well as improved linearity in the normal operating range thereof.

A significant feature of the invention resides in the fact that all necessary calculations to correct the flow rate reading may be performed by a low-cost digital calculator of the existing hand-held integrated circuit type.

Briefly stated, these objects are attained in a vortex meter in which a single sensor is used to detect both the frequency of the fluid oscillations and the temperature of the fluid metered, the sensor signal having an A-C component representing the frequency of the fluidic oscillations and a D-C component representing the temperature of the fluid.

The A-C component is separated from the D-C component and is converted into a digital value representing the uncorrected flow rate. The D-C component is separated from the A-C component and is converted into a digital value representing the temperature. The physical characteristics of the fluid being metered are converted into digital values representing the fluid properties. A digital computer is provided responsive to the uncorrected flow rate digital value, the temperature digital value and the fluid property values to produce an output signal representing the corrected flow rate.

OUTLINE OF THE DRAWING

For a better understanding of the invention, as well as other objects and further features thereof, reference is made to the following detailed description to be read in conjunction with the accompanying drawing wherein:

FIG. 3 shows a typical calibration curve for a flowmeter of the vortex type;

FIG. 4 graphically shows the relationship between temperature of viscosity for various grades of oil;

FIG. 5 shows the relationship between the resistance of a strain gauge and temperature; and FIG. 6 is a graph explanatory of the operation of the fluid characteristic switch included in the data processing system.

DESCRIPTION OF THE INVENTION

The Meter

Figure 1:
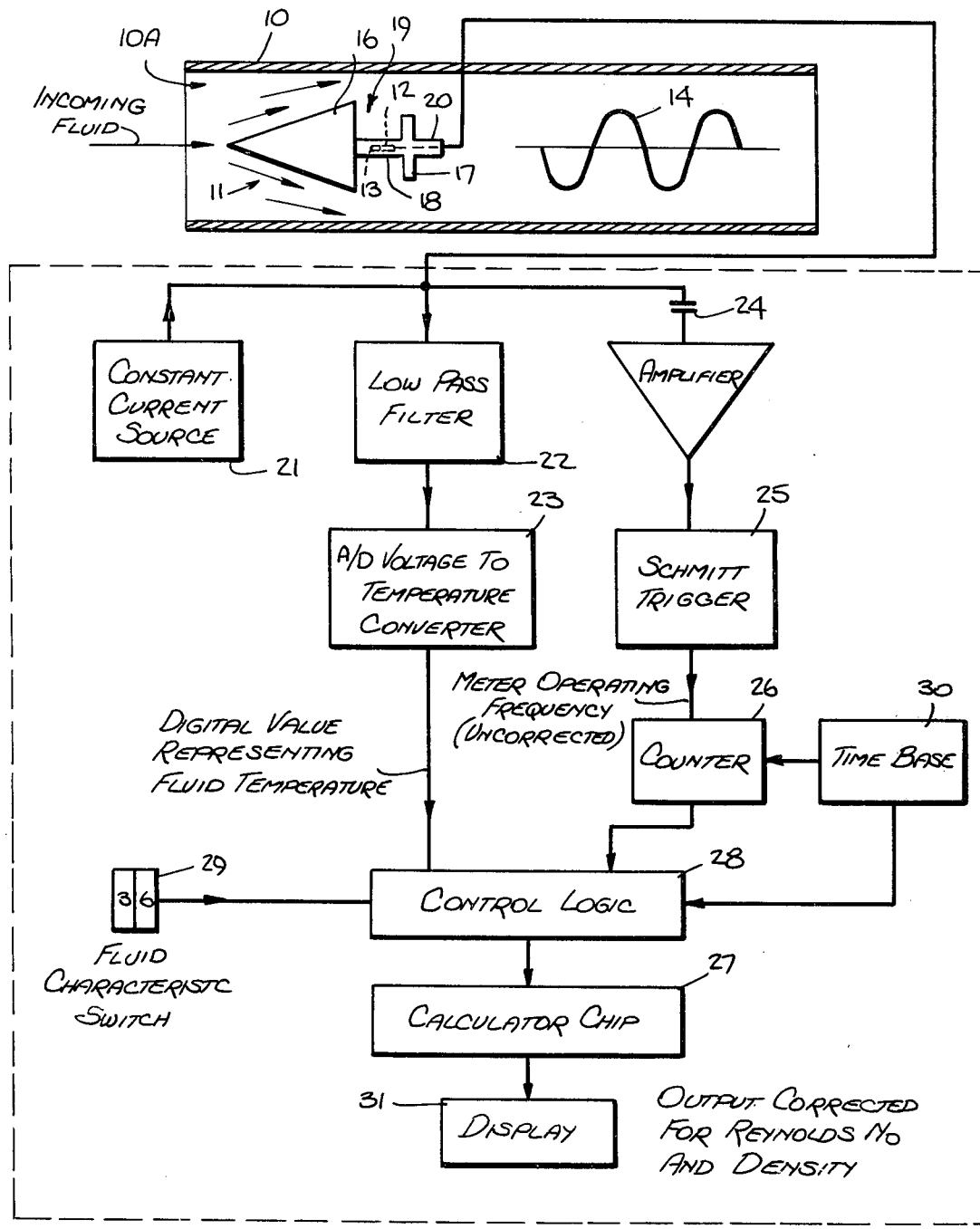
FIG. 1 is a preferred embodiment of a flowmeter having a data processing system in accordance with the invention.
Figure 2:
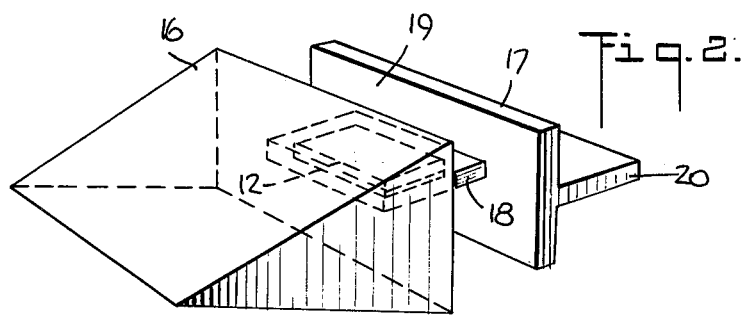
FIG. 2 is a perspective view of the obstacle assembly included in the flowmeter.

Referring now to the drawing and more particularly to FIG. 1, a flowmeter of the vortex-type comprises a flow conduit 10, an obstacle assembly generally designated by numeral 11, mounted within the assembly, and a sensor constituted by a strain gauge 12 elastically suspended within a cavity 13 in the assembly or otherwise mounted in or on the obstacle assembly to sense vibratory motion resulting from fluidic oscillations.

Conduit 10, which may have a circular cross-section or be in other cross-sectional form, includes an inlet 10A into which a fluid to be metered is introduced. The flow impinges on obstacle assembly 11 which acts to divide the flow around the obstacle, the assembly producing fluidic perturbations in the form of Karman vortex street. The resultant fluidic oscillations in the downstream wake, roughly represented by trace line 14, are translated into corresponding mechanical vibrations that are sensed by strain gauge 12, preferably of the semiconductor type, to produce an electrical signal which is applied to an electronic data processing system in accordance with the invention to provide accurate flow rate readings. This system being enclosed within block 15.

Obstacle assembly 11 is formed by a front section 16 and a rear section 17 mounted behind the front section by a cantilever support constituted by a flexible web 18. Front section 16 is a contoured block having a triangular or delta shaped cross-section which is uniform throughout the longitudinal axis of the block, this axis being perpendicular to the flow axis of the conduit. The ends of the front section are secured to the wall of the conduit whereby the front section is fixedly held within the conduit.

The apex of block 16 faces the incoming fluid, the inclined sides thereof forming leading edges which are swept by the flow of fluid to create vortices. The invention is not limited to obstacle bodies of this shape, for the body may take other shapes such as those disclosed in the Burgess U.S. Pat. No. 3,589,185 or in the Bird U.S. Pat. No. 3,116,639.

The rear section 17 takes the form of a non-streamlined body which in this embodiment is in strip form and is maintained by the web 18 in spaced relation to the front section, the plane of the strip being parallel to the flat base of the block. The rear section shape is such as to interfere with the vortex street and the gap 19 created between the front section block and the rear section tends to trap the vortices to strengthen and stabilize the vortex street produced thereby. While a strip is shown in the wake of the front section shedding block, it is to be understood that the invention encompasses any rear section whose shape and diameter are such as to interfere with the vortex street, as distinguished from a vane or other streamlined body which though acted upon by the street does not interfere therewith.

Because rear section 17 is cantilevered by means of flexible web 18, it is deflectable. The web, though bendable, has sufficient rigidity so as to permit only a slight deflection of the rear section. As a consequence of the fluidic oscillations produced within the conduit, indicated by wave 14, the rear section is excited into vibration at a rate corresponding to the frequency of the oscillations. The natural resonance of the deflectable rear section is such as to be well outside the normal frequency range of the meter whereby mechanical resonance peaks are absent and the amplitude of the vibrating motion accurately relects the amplitude of the fluidic oscillations. The vibratory motion may be enhanced by securing a tail 20 to rear section 17, the tail extending downstream. In practice, the front and rear sections could be rigidly interconnected and the tail made deflectable relative thereto. The downstream section of the assembly carried out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting web, as a result of the vibrating action, is minimized and failures do not arise after prolonged operation.

It is important to note that the magnitude of deflection is not of primary importance, for the flowrate information is given by the frequency, not the amplitude of vibration. Hence while the deflection magnitude is made extremely small in order to provide an acceptable fatigue life, this does not militate against a readable output of varying frequency. From the basic Strouhal Number relationship for vortex shedding bodies, the oscillation frequency is approximately equal to 0.22 (V/D), where V is the velocity past the body and D is the body width. It is to be understood that the placement of the strain gauge depends on the configuration of the obstacle assembly and that the strain gauge is placed in the deflectable section of the assembly, wherever that section is located. In other words, this invention is applicable to any form of vortex meter whose obstacle assembly includes a deflectable section that is caused to mechanically vibrate at a frequency corresponding to the frequency of fluidic oscillations produced within the meter.

The Variables

FIG. 3 shows a typical calibration curve for the vortex-shedding flowmeter illustrated in FIG. 1 in which the Reynolds number of the flow tube is plotted against the meter factor (cycles/gal.). It will be seen that in the portion $N_{or}$ of the curve which lies within the limits of the normal range of fluid viscosity, the meter factor is fairly steady with changes in Reynolds number. But in the high viscosity operating region beyond the normal range, the meter factor rises sharply with an increase in viscosity, as shown by the Ab portion of the calibration curve.

The equation for Reynolds number is shown below:

$$R = \frac{\rho VD}{\mu} = \frac{VD}{v} \quad \left(v = \frac{\mu}{\rho}\right)$$

where
$R$ = Pipe Reynolds No.
$\rho$ = Density
$V$ = Velocity
$D$ = Pipe Diameter
$\mu$ = Viscosity
$V$ = Kinematic Viscosity
$\alpha$ = Temperature The equation indicates that for a fixed value of fluid viscosity and density in a flowmeter having a given pipe diameter, the calibration curve also represents a fluid velocity and flow. The equation also indicates that for higher viscosity fluids, the Reynolds number becomes lower.

Curves 1, 2, 3, 4 and 5 in FIG. 4 show the relationship between temperature (degrees F) for different grades of oil. Curve 1 For SAE No. 70 oil shows a marked increase in viscosity as the temperature drops from +230° F to about +50° F. Similar sharp increases in viscosity with reductions in temperature are shown for SAE No. 50 oil in curve 2, for SAE No. 43 oil in curve 3, for SAE No. 20 oil in curve 4 and SAE No. 10 oil in curve 5. SAE base oils also undergo large changes in density with changes in temperature. Curves showing this relationship are published in the Marks Handbook for Mechanical Engineers.

But it is not only oils which exhibit large density and viscosity changes with variations in temperature, for this relationship is true of most liquids. Thus, as shown in the table I below which deals with the density and viscosity of water in terms of temperature, it will be seen that these properties of water change markedly with changes of temperature.

TABLE I

| Water | | | |
|---|---|---|---|
| Temperature | Density $\rho$ | Viscosity $\mu \times 10^6$ | Kinematic viscosity $v \times 10^6$ |
| [° C] [° F] | [lbf sec²/ft⁴] | [lbf sec/ft²] | [ft²/sec] |
| −20   −4 | — | — | — |
| −10   14 | — | — | — |
| 0   32 | 1.939 | 37.5 | 19.4 |
| 10   50 | 1.939 | 27.2 | 14.0 |
| 20   68 | 1.935 | 21.1 | 10.9 |
| 40   104 | 1.924 | 13.68 | 7.11 |
| 60   140 | 1.907 | 9.89 | 5.19 |
| 80   176 | 1.886 | 7.45 | 3.96 |
| 100   212 | 1.861 | 5.92 | 3.19 |

It is evident from the foregoing that unless a correction is made for the effect of temperature on the density and viscosity of the fluid passing through the vortex flowmeter, it is impossible to obtain highly accurate readings.

Data Processing System

The data processing system shown in FIG. 1 is adapted to correct for the effect of temperature on the accuracy of the flowmeter reading.

If the fluid characteristics of the fluid being metered are known and the fluid temperature is also known, it is possible to determine from existing tables and published graphs both fluid viscosity and density. Thus the foregoing table I for water gives the density and viscosity of water in the temperature range of 0° to 100° C. And if both the viscosity and density values are available, the Reynolds number can be calculated and the meter factor corrected. Then using density, the flow can again be corrected, giving the correct mass flow.

In the present invention, a single sensor 12 in the flowmeter is used to detect both the fluidic oscillations whose frequency is a function of flow rate and the temperature of the fluid being metered. That is to say, strain gauge 12 not only senses the vibratory frequency of the deflectable section of the obstacle assembly, but it also responds to the temperature of the fluid, in that its resistance varies as a function thereof.

FIG. 5 graphically shows the relationship between the resistance of a commercially-available semi-conductor type of strain gauge and temperature. It will be seen that in a temperature range extending between −40° F and 340° F, the resistance increases from 600 ohms to 2500 ohms, hence this gauge is highly sensitive to changes in temperature.

A constant current from a suitable source 21 is conducted through the semi-conductor strain gauge. The level of this current is low, hence the gauge undergoes very little electrical heating and operates at a temperature substantially the same as the temperature of the fluid. The invention is not limited to strain gauge sensors, and in vortex meters which use thermistor sensors, the thermistor may be used to sense both the frequency of the vortices and the temperature of the fluid.

With zero fluid flow, a D-C voltage is developed across the strain gauge, which voltage is a measure of the resistance of the gauge and varies with temperature. As flow commences and vortices start shedding, the strain gauge is alternately flexed in one and then in the opposite direction to produce alternating changes in resistance value. Thus the voltage developed across the strain gauge as a result of vibration has an A-C component representing the vortex frequency and a D-C component representing the temperature of the fluid. The A-C component of the sensor signal, which is a function of flow rate, is superimposed over the D-C component, which is a function of temperature.

In the electronic system, the D-C component from the sensor is segregated from the A-C component by means of a low-pass filter 22. This filter blocks the A-C component and passes only the D-C component to an analog-to-digital converter 23 that converts the input voltage to a digital value representing the sensed temperature of the fluid.

The A-C component from sensor 12 is separated from the D-C component by means of capacitor 24 and is applied to a Schmitt trigger 25 which changes the A-C component into a square wave of the same frequency. This square wave is counted by a digital counter 26 for a predetermined interval to produce at the end of the counting interval a digital value representing the uncorrected flow rate.

The calculations which are necessary to correct for the effect of temperature on the properties of the fluid are performed by an electronic computer 27. This computer is preferably in the form of an integrated circuit chip of the type currently used in low-cost, hand-held electronic calculators. Thus fed into computer 27 through a control logic module 28 are (a) the fluid characteristics in digital form obtained from fluid characteristic switch 29, (b) temperature data in digital form obtained from A/D converter 23 and (c) flow data in digital form obtained from counter 26, the operation of the counter and control logic being coordinated by the time base 30.

The function of fluid characteristic switch 29 will now be explained in connection with FIG. 6 in which the ratio of frequency to viscosity or pipe Reynolds number is plotted against cycles/gal (K). It is to be noted that $R = VD/v$, where $R$ is the pipe Reynolds number, $V$ is the velocity, $D$ is the pipe diameter and $v$ is the kinematic viscosity. Since velocity $V$ is proportional to $f$, the meter operating frequency, and since pipe diameter $D$ is constant for a given meter, $R = (f/v) K$, where $K$ is a constant.

Control logic 28 is arranged to store the deviation of the meter from flat at three distinct points, A, B and C in terms of $f/v$ and the deviation from the nominal meter factor $K$ in percentage terms (%) for a given meter size. Alternatively, the three corner points may be programmed into the control logic by means of an additional switch similar in structure to fluid characteristic switch 29.

Because control logic 28 receives a digital value from counter 28 representing the meter operating frequency $f$, it only requires a viscosity input for the fluid being measured to calculate the corrected meter factor as represented by lines A-B and B-C in FIG. 6.

To carry out this calculation, the viscosity of the fluid being measured must be known and the change in fluid viscosity as a function of temperature (Viscosity Index) must also be known. These are the two numbers that make up the viscosity information set into the fluid characteristic switch 29. Then with the digital value representing fluid temperature received from converter 28, it becomes possible to calculate the actual fluid viscosity.

It is to be noted that a large improvement in accuracy is realized, this being evident when the meter curve in FIG. 6 is compared to the corrected meter factor as represented by lines A–B and B–C as compared to the nominal meter factor.

Thus calculator chip 27 is supplied with all of the data necessary to correct the flow rate data for the changes in fluid properties resulting from changes in temperature. The calculator produces an output signal which is supplied to a display 31 to produce a highly accurate reading of flow rate over a large viscosity range.

While there has been shown and described a preferred embodiment of a linear vortex-type flowmeter in accordance with the invention, it will be appreciated that many changes and modifications may be made therein without, however, departing from the essential spirit thereof.

I claim:

1. A highly-accurate flowmeter for metering a fluid whose density and viscosity varies as a function of fluid temperature comprising:
    A. a flow tube having means therein to intercept the fluid to be metered to produce fluidic oscillations therein whose frequency is a function of the flow rate of the fluid passing through the tube;
    B. means to sense the frequency of the fluidic oscillations and to derive therefrom an uncorrected flow rate value in digital terms;
    C. means to sense the prevailing temperature of the fluid passing through the tube and to derive therefrom a temperature value in digital terms, said means to sense the frequency of the fluidic oscillations and said means to sense the temperature being constituted by a common sensor yielding a signal having a frequency component and a temperature component and further including means to segregate said frequency component from said temperature component to provide said uncorrected flow rate digital value and said digital temperature value;
    D. means to provide a fluid characteristics value in digital terms, depending on the relationship between the density and viscosity of said fluid and temperature; and
    E. digital computer means responsive to said uncorrected flow rate digital value, said digital temperature value and said fluid characteristics digital value to produce a digital output signal which represents the flow rate corrected for the effect of temperature on the characteristics of the fluid.

2. A flowmeter as set forth in claim 1, wherein said common sensor is a thermistor.

3. A flowmeter as set forth in claim 1, wherein said means in said tube to intercept the fluid is constituted by an obstacle assembly having a deflectable section which is excited into vibration by said fluidic oscillations, and said means to sense the frequency of said fluidic oscillations is a strain gauge mounted on said deflectable section.

4. A flowmeter as set forth in claim 3, wherein said strain gauge is a semi-conductor element whose resistance varies as a function of the temperature of said fluid and therefore also functions as the means to sense said temperature.

5. A highly-accurate flowmeter for metering a fluid whose density and viscosity varies as a function of fluid temperature comprising:
    A. a flow tube having an obstacle assembly mounted therein to produce fluidic oscillations whose frequency is a function of the flow rate of the fluid passing through the tube, said assembly having a deflectable section which is excited into vibration by said fluidic oscillations;
    B. a strain gauge mounted on said deflectable section, said gauge having an electrical resistance which varies as a function of the prevailing temperature of the fluid being metered to produce a signal having an A-C component whose frequency is determined by the vibratory rate of said section and a D-C component which depends on the varying resistance of the gauge and hence on the temperature of the fluid;
    C. means to separate said A-C component from said D-C component and to derive therefrom an uncorrected flow rate value in digital terms;

D. means to separate said D-C component from said A-C component and to derive therefrom a temperature value in digital terms;
E. means to provide a fluid characteristics valve in digital terms depending on the relationship between density and viscosity of the fluid being metered and temperature, and
F. digital computer means responsive to said uncorrected flow rate value, said temperature value and said fluid characteristics value to produce an output signal which represents the flow rate corrected for the effect of temperature on the physical characteristics of the fluid.

6. A flowmeter as set forth in claim 5, wherein said means to separate said A-C component from said D-C component and to produce said uncorrected flow rate value are constituted by a capacitor whose A-C output is applied to a Schmitt trigger to produce a corresponding square wave which is counted by a counter during a predetermined interval to produce a digital value.

7. A flowmeter as set forth in claim 6, wherein said means to separate said A-C component from said D-C component and to produce said temperature value is a low-pass filter whose D-C output is applied to an analog-to-digital converter to produce a digital value depending on temperature.

8. A flowmeter as set forth in claim 5, wherein said digital computer is constituted by an integrated circuit chip.

* * * * *

UNITED STATES PATENT OFFICE
CERTIFICATE OF CORRECTION

Patent No. 4,033,188    Dated July 5, 1977

Inventor(s) Peter J. Herzl

It is certified that error appears in the above-identified patent and that said Letters Patent are hereby corrected as shown below:

Column 1, last line after "factor" the following should have been inserted -- . In the typical curve for a vortex meter, the meter factor --

Column 2, line 22 "accurrate" should have read -- accurate --

Column 4, line 32 "relects" should have read -- reflects --

Column 7, line 16 "the" should have read -- a --

Column 7, line 25 "(f/v)" should have been printed -- f/v -- without the parentheses.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*